United States Patent
Cheng et al.

(10) Patent No.: US 12,439,356 B2
(45) Date of Patent: Oct. 7, 2025

(54) USER EQUIPMENT AND METHOD FOR TIMING ALIGNMENT

(71) Applicant: SHARP KABUSHIKI KAISHA, Sakai (JP)

(72) Inventors: Chien-Chun Cheng, Taipei (TW);
Hsin-Hsi Tsai, Taipei (TW);
Chia-Hung Wei, Taipei (TW);
Hai-Han Wang, Taipei (TW);
Yung-Lan Tseng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 374 days.

(21) Appl. No.: 17/741,691

(22) Filed: May 11, 2022

(65) Prior Publication Data

US 2022/0369264 A1 Nov. 17, 2022

Related U.S. Application Data

(60) Provisional application No. 63/186,996, filed on May 11, 2021.

(51) Int. Cl.
*H04W 56/00* (2009.01)
*H04W 48/08* (2009.01)
*H04W 84/06* (2009.01)

(52) U.S. Cl.
CPC ....... *H04W 56/0055* (2013.01); *H04W 48/08* (2013.01); *H04W 84/06* (2013.01)

(58) Field of Classification Search
CPC ......... H04W 56/0055; H04W 56/0045; H04W 48/08; H04W 84/06
See application file for complete search history.

(56) References Cited

U.S. PATENT DOCUMENTS

| | | |
|---|---|---|
| 2021/0083760 A1 | 3/2021 | Schmidt et al. |
| 2021/0391909 A1 | 12/2021 | Lee et al. |

FOREIGN PATENT DOCUMENTS

| | | | | |
|---|---|---|---|---|
| CN | 110679095 | | 1/2020 | |
| WO | 2020031120 | | 2/2020 | |
| WO | WO-2022052917 A1 | * | 3/2022 | ............. G01S 19/05 |

OTHER PUBLICATIONS

3GPP TS 38.133, "3rd Generation Partnership Project; Technical Specification Group Radio Access Network; NR; Requirements for support of radio resource management (Release 16)", V16.6.0 (Dec. 2020).
3GPP TS 38.211, "3rd Generation Partnership Project; Technical Specification Group Radio Access Network; NR; Physical channels and modulation (Release 16)", V16.5.0 (Mar. 2021).

(Continued)

*Primary Examiner* — Jianye Wu
(74) *Attorney, Agent, or Firm* — ScienBiziP, P.C.

(57) ABSTRACT

A method and a user equipment (UE) for performing timing alignment is provided. The method includes receiving, from a Base Station (BS), a Timing Advance (TA) report configuration in System Information (SI); and transmitting, to the BS, a TA report based on the TA report configuration. The TA report configuration includes an indication for enabling or disabling the UE to transmit the TA report.

6 Claims, 10 Drawing Sheets

(56) References Cited

OTHER PUBLICATIONS

3GPP TR 38.821, "3rd Generation Partnership Project; Technical Specification Group Radio Access Network; Solutions for NR to support non-terrestrial networks (NTN) (Release 16)", V16.0.0 (Dec. 2019).
Moderator (MediaTek), "Summary #3 of AI 8.15.2 Enhancements to time and frequency synchronization", 3GPP TSG RAN WG1 Meeting #104bis-e Apr. 12-Apr. 20, 2021, R1-2103950.
Moderator (Thales), "FL Summary on enhancements on UL time and frequency synchronization for NR", 3GPP TSG-RAN WG1 Meeting #104-bis-e e-Meeting, Apr. 12-Apr. 20, 2021, R1-2104076.
Asia Pacific Telecom, FGI, Triggering of UE-specific TA report, 3GPP TSG-RAN WG2 Meeting #113 bis electronic, Online, Apr. 12-Apr. 20, 2021, R2-2103261, section 2.3.
Oppo, Summary of offline 103—[NTN] Rach aspects—2nd round, 3GPP TSG-RAN WG2 Meeting #113bis-e, Electronic meeting, Apr. 12-20, 2021, R2-2104370, p. 10.

\* cited by examiner

USER EQUIPMENT AND METHOD FOR TIMING ALIGNMENT

CROSS-REFERENCE TO RELATED APPLICATION(S)

The present disclosure claims the benefit of and priority to U.S. Provisional Patent Application Ser. No. 63/186,996, filed on May 11, 2021, entitled "EARLY DATA TRANSMISSION (EDT) ENHANCEMENT ON NB-IOT IN NTN," the content of which is hereby incorporated herein fully by reference into the present disclosure for all purposes.

FIELD

The present disclosure is related to wireless communication and, more specifically, to timing alignment in a wireless communication system.

BACKGROUND

Various efforts have been made to improve different aspects of wireless communication for cellular wireless communication systems, such as fifth generation (5G) new radio (NR), by improving data rate, latency, reliability, and mobility in these systems. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art, such as improvements in timing alignment for Non-Terrestrial Network (NTN) wireless communication.

SUMMARY

The present disclosure is related to timing alignment in a wireless communication system.

In a first aspect of the present disclosure, a method performed by a User Equipment (UE) for timing alignment is provided. The method includes receiving, from a Base Station (BS), a Timing Advance (TA) report configuration in System Information (SI); and transmitting, to the BS, a TA report based on the TA report configuration. The TA report configuration includes an indication for enabling or disabling the UE to transmit the TA report.

In an implementation of the first aspect, the TA report includes a least integer number of slots that are greater than or equal to a TA value.

In another implementation of the first aspect, the TA value corresponds to a UE-specific TA and is calculated based on at least one of Global Navigation Satellite System (GNSS) position information, a common TA, and satellite ephemeris information.

In an implementation of the first aspect, the indication is provided by a Non-Terrestrial Network (NTN)-specific System Information Block (SIB).

In a second aspect of the present disclosure, a UE in a wireless communication system for performing timing alignment is provided. The UE includes at least one processor; and at least one memory coupled to the at least one processor, the at least one memory storing a computer-executable program that, when executed by the at least one processor, causes the UE to receive, from a Base Station (BS), a Timing Advance (TA) report configuration in System Information; and transmit, to the BS, a TA report based on the TA report configuration. The TA report configuration includes an indication for enabling or disabling the UE to transmit the TA report.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
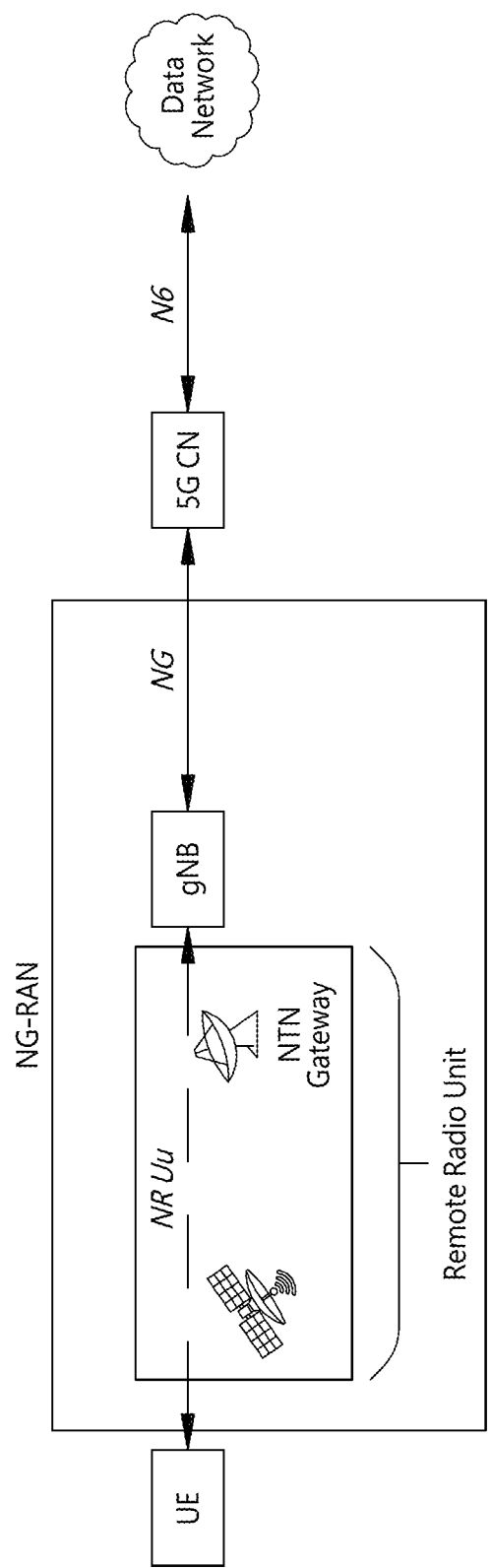
FIG. 1 illustrates a schematic diagram of a Networking-RAN architecture with a transparent satellite, according to an example implementation of the present disclosure.

Abbreviations used in this disclosure include:

| Abbreviation | Full name |
|---|---|
| 3GPP | 3rd Generation Partnership Project |
| ACK | Positive Acknowledgement |
| ARFCN | Absolute Radio Frequency Channel Number |
| AS | Access Stratum |
| BFR | Beam Failure Recovery |
| BS | Base Station |
| BWP | Bandwidth Part |
| CE | Control Element |
| CHO | Conditional Handover |
| CN | Core Network |
| CSI | Channel State Information |
| CP | Cyclic Prefix |

| Abbreviation | Full name |
| --- | --- |
| CP-EDT | Control Plane-Early Data Transmission |
| DCI | Downlink Control Information |
| DL | Downlink |
| DRB | Data Radio Bearer |
| DTCH | Dedicated Traffic Channel |
| EARFCN | Evolved Universal Terrestrial Radio Access Absolute Radio Frequency Channel Number |
| EDT | Early Data Transmission |
| eNB | Evolved Node B |
| FO | Frequency Offset |
| FOV | Field of View |
| GEO | Geostationary Earth Orbiting |
| gNB | Next Generation Node B |
| GNSS | Global Navigation Satellite System |
| GW | Gateway |
| HARQ | Hybrid Automatic Repeat Request |
| ICI | Inter Carrier Interference |
| ID | Identifier/Identity |
| IE | Information Element |
| IoT | Internet of Things |
| LBT | Listen Before Talk |
| LEO | Low-Earth Orbit |
| MAC | Medium Access Control |
| MCG | Master Cell Group |
| MCL | Maximum Coupling Loss |
| MIB | Master Information Block |
| MM | Mobility Management |
| MN | Master Node |
| Msg | Message |
| NAS | Non-Access Stratum |
| NG-AP | Next Generation-Application Protocol |
| NR | New Radio |
| NPDSCH | Narrowband Physical Downlink Shared Channel |
| NPUSCH | Narrowband Physical Uplink Shared Channel |
| NPRACH | Narrowband Physical Random Access Channel |
| NTN | Non-Terrestrial Network |
| NW | Network |
| OFDM | Orthogonal Frequency Division Multiplexing |
| PBCH | Physical Broadcast Channel |
| PCell | Primary Cell |
| PDCCH | Physical Downlink Control Channel |
| PDSCH | Physical Downlink Shared Channel |
| PEI | Paging Early Indication |
| PRACH | Physical Random Access Channel |
| PSCell | Primary Secondary Cell |
| PTRS | Phase Tracking Reference Signal |
| PUCCH | Physical Uplink Control Channel |
| PUSCH | Physical Uplink Shared Channel |
| RA | Random Access |
| RACH | Random Access Channel |
| RAN | Radio Access Network |
| RAT | Radio Access Technology |
| RAR | Random Access Response |
| Rel | Release |
| RF | Radio Frequency |
| RRC | Radio Resource Control |
| RS | Reference Signal |
| RTD | Round Trip Delay |
| RTT | Round Trip Time |
| SCell | Secondary Cell |
| SCG | Secondary Cell Group |
| SCH | Shared Channel |
| SCS | Sub Carrier Spacing |
| SI | System Information |
| SIB | System Information Block |
| SL | Sidelink |
| SM | Session Management |
| SN | Secondary Node |
| SPS | Semi-Persistent Scheduling |
| SRB | Signaling Radio Bearer |
| SRI | Satellite Radio Interface |
| SRS | Sounding Reference Signal |
| SpCell | Special Cell |
| SS | Synchronization Signal |
| SSB | Synchronization Signal Block |
| TA | Timing Advance |
| TAC | Timing Advance Command |
| TAG | Timing Advance Group |
| TBS | Transport Block Size |
| TDD | Time Division Duplexing |
| TS | Technical Specification |
| TTC | Telemetry Tracking and Command |
| UCG | Uplink Compensation Gap |
| UE | User Equipment |
| UP-EDT | User Plane-Early Data Transmission |
| UL | Uplink |
| URLLC | Ultra-Reliable and Low Latency Communication |
| WI | Working Item |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on computer-readable media such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Application-Specific Integrated Circuits (ASICs), programmable logic arrays, and/or using one or more Digital Signal Processor (DSPs). Although some of the example implementations in the present disclosure are directed to software installed and executing on computer hardware, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., an LTE system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC) NW, an Evolved Universal Terrestrial Radio Access NW (E-UTRAN), a Next-Generation Core (NGC), a 5G Core (5GC) Network or an Internet), through a RAN established by the BS/Cell.

It should be noted that, in the present disclosure, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an eNB as in the LTE-A, a Radio NW Controller (RNC) as in the UMTS, a Base Station Controller (BSC) as in the Global System for Mobile communications (GSM)/GSM EDGE (Enhanced Data rates for GSM Evolution) Radio Access NW (GERAN), a Next Generation eNB (ng-eNB) as in an E-UTRA BS in connection with the 5GC, a gNB as in the 5G Access NW (5G-AN), and any other apparatus capable of controlling radio communication and managing radio resources within a cell. The BS may connect to serve the one or more UEs through a radio interface to the NW.

ABS may be configured to provide communication services according to at least one of the following RATs: Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), LTE-A Pro, and a next generation RAT. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage (e.g., each cell schedules the DL and optionally UL resources to at least one UE within its radio coverage for DL and optionally UL packet transmissions). The BS may communicate with one or more UEs in the radio communication system through the plurality of cells. A cell may allocate SL resources for supporting proximity service (ProSe). Each cell may have overlapped coverage areas with other cells.

In Multi-RAT Dual Connectivity (MR-DC) cases, the primary cell of an MCG or an SCG may be called as a SpCell. A PCell may refer to the SpCell of an MCG. A PSCell may refer to the SpCell of an SCG. MCG refers to a group of serving cells associated with a MN, comprising the SpCell and optionally one or more SCells. SCG refers to a group of serving cells associated with an SN, comprising the SpCell and optionally one or more SCells.

In some implementations, the UE may not have (LTE/NR) RRC connections with the concerned serving cells of the associated services. In other words, the UE may not have UE-specific RRC signal exchange with the serving cell. Instead, the UE may only monitor the DL SS signals (e.g., DL synchronization burst sets) and/or broadcast SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the CP, may also be used. Additionally, two coding schemes are considered for NR: (1) low-density parity-check (LDPC) code and (2) polar code. The coding scheme adaptation may be configured based on the channel conditions and/or service applications.

It is also considered that in a transmission time interval of a single NR frame, at least DL transmission data, a guard period, and UL transmission data should be included. The respective portions of the DL transmission data, the guard period, the UL transmission data should also be configurable, for example, based on the NW dynamics of NR. In addition, SL resources may also be provided in an NR frame to support ProSe services.

Any two or more than two of the following sentences, paragraphs, (sub)-bullets, points, actions, behaviors, terms, alternatives, aspects, examples, or claims described in the following invention(s) may be combined logically, reasonably, and properly to form a specific method.

Any sentence, paragraph, (sub)-bullet, point, action, behaviors, terms, alternatives, aspects, examples, or claims described in the following invention(s) may be implemented independently and separately to form a specific method.

Dependency, such as "based on", "more specifically", "preferably", "in one embodiment", "in one alternative", "in one example", "in one aspect", "in one implementation", etc., in the present disclosure is just one possible example which would not restrict the specific method.

FIG. 1 illustrates a schematic diagram of a Networking-RAN architecture 10 with a transparent satellite, according to an example implementation of the present disclosure. Specifically, the satellite payload implements frequency conversion and an RF amplifier in both UL and DL directions, and corresponds to an analog RF repeater. The satellite repeats the NR-Uu radio interface from the feeder link (between a NTN gateway and a satellite) to the service link (between a satellite and a UE), and vice versa.

The SRI on the feeder link is an NR-Uu interface. In other words, the satellite may not terminate the NR-Uu interface. The NTN GW supports all necessary functions to forward the signal of the NR-Uu interface. Different transparent satellites may be connected to a same eNB/gNB on the ground. While several eNBs may access a single satellite payload, the description has been simplified to a unique eNB accessing the satellite payload, without loss of generality.

Figure 2:
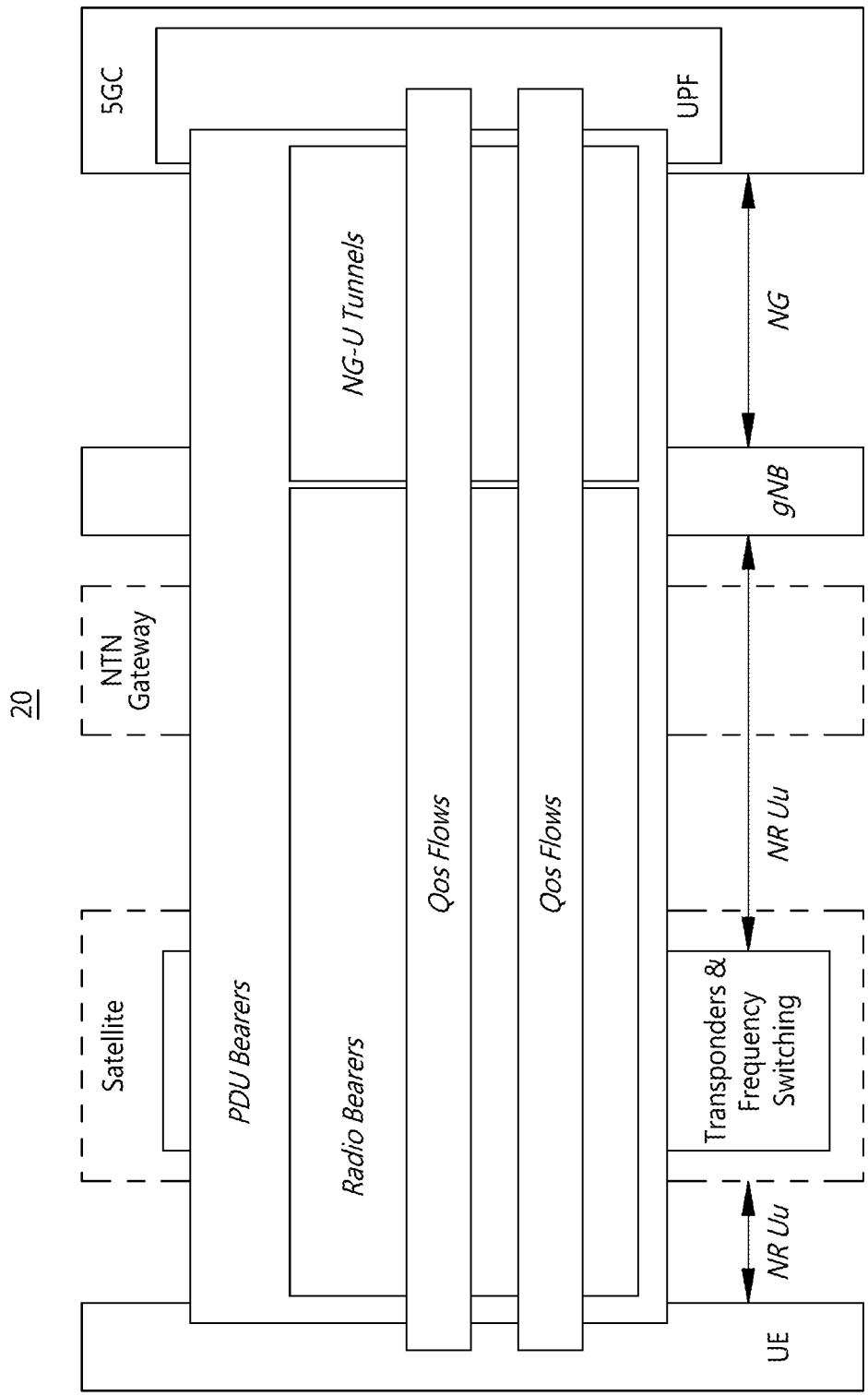
FIG. 2 illustrates a schematic diagram of a transparent-satellite-based next-generation radio access network (NG-RAN), according to an example implementation of the present disclosure.

FIG. 2 illustrates a schematic diagram of a transparent-satellite-based NG-RAN 20, according to an example implementation of the present disclosure. As shown in FIG. 2, the transparent-satellite-based NG-RAN 20 is also depicted with mapping to quality of service (QoS) flows.

Figure 3:
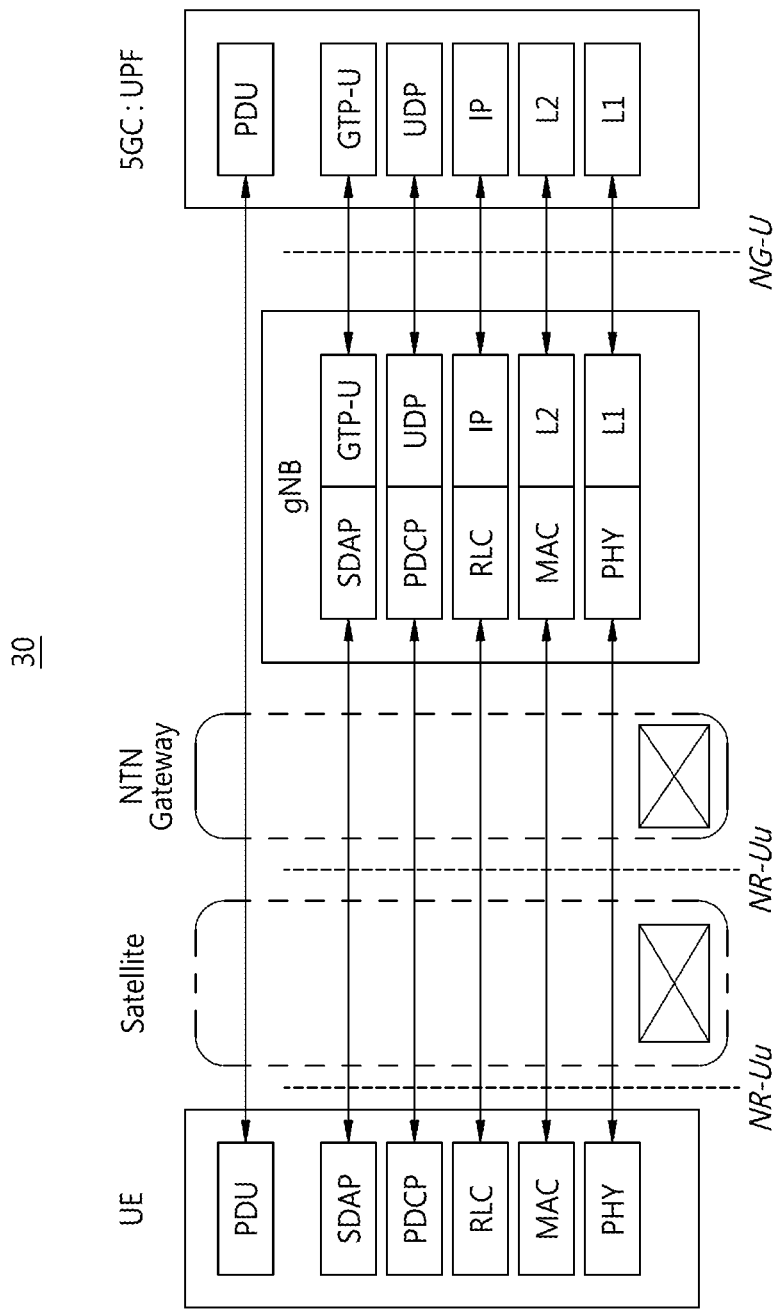
FIG. 3 illustrates a schematic diagram of a user plane protocol stack, according to an example implementation of the present disclosure.

FIG. 3 illustrates a schematic diagram of a user plane protocol stack 30, according to an example implementation of the present disclosure. As shown in FIG. 3, the UE may have access to a 5G system via a 3GPP NR-based radio interface, and a detailed user plane protocol stack is introduced in FIG. 3.

Figure 4:
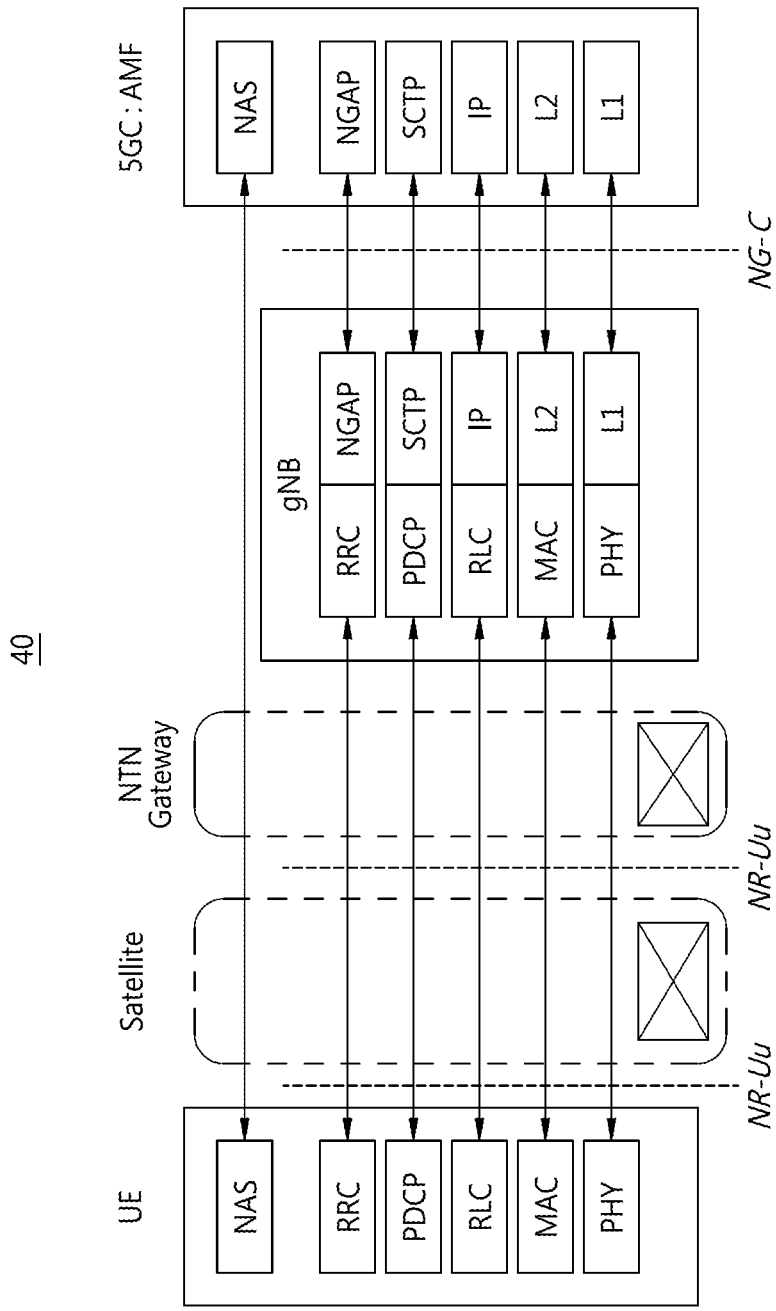
FIG. 4 illustrates a schematic diagram of a control plane protocol stack, according to an example implementation of the present disclosure.

FIG. 4 illustrates a schematic diagram of a control plane protocol stack 40, according to an example implementation of the present disclosure. As shown in FIG. 4, the user data is transported between the UE and the 5GC through an NTN Gateway, and a detailed control plane protocol stack is introduced in FIG. 4. Specifically, NAS (including a NAS-SM and a NAS-MM) signaling from the UE and the NG-AP signaling from the eNB may be transported toward the 5GC and vice versa.

Satellite ephemeris information may contain information about orbital mechanics of all commercial satellites that are publicly available from multiple sources. This information is used by astronomers to describe the location and orbital behavior of stars and any other astronomic bodies.

In some implementations, the satellite ephemeris information is expressed in an American Standard Code for Information Interchange (ASCII) file using Two-Line Element (TLE) format. The TLE data format may encode a list of orbital elements of an Earth-orbiting object in two 70-column lines. The TLE format may be an expression of mean orbital parameters as "True Equator, Mean Equinox" (TEME) coordinates, thus filtering out short term perturbations.

Figure 5:
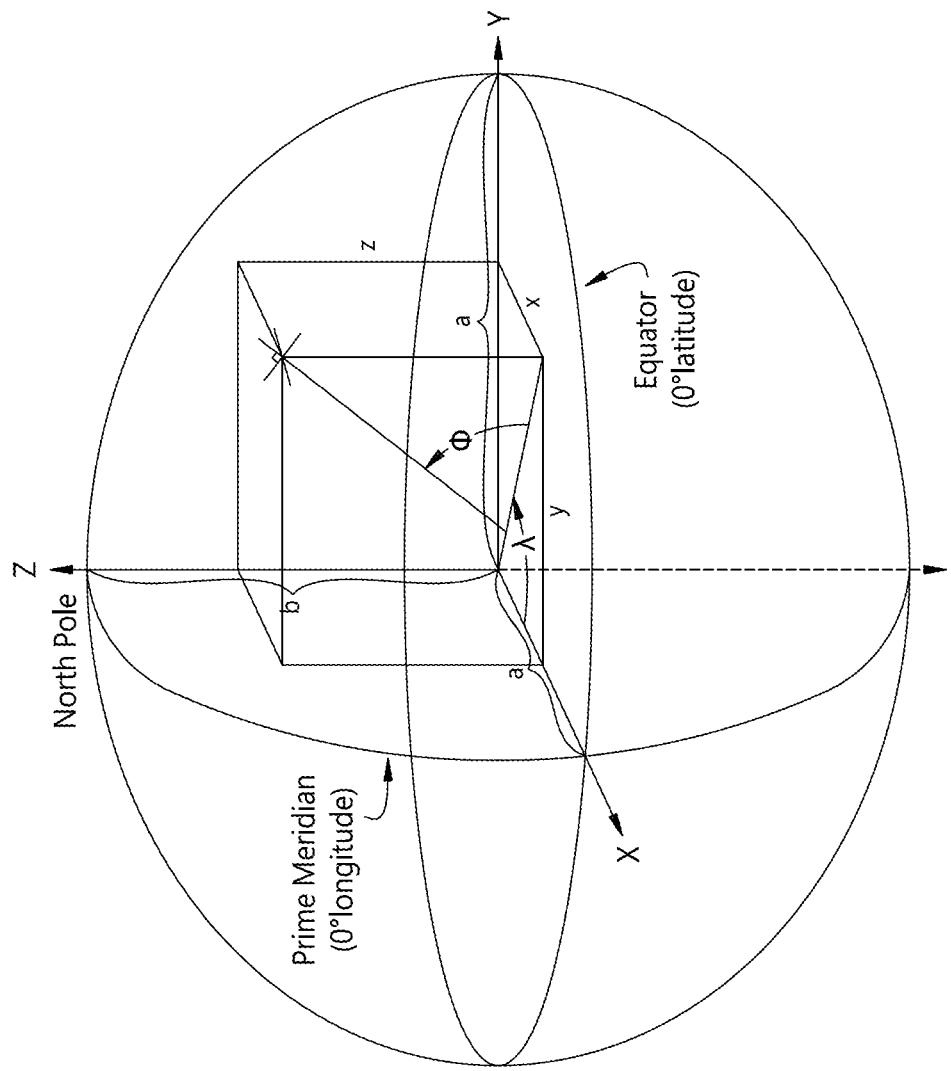
FIG. 5 illustrates a perspective view of Earth-Centered, Earth-Fixed (ECEF) coordinates in relation to latitude and longitude, according to an example implementation of the present disclosure.

From its TLE format data, the SGP4 (Simplified General Propagation 4) model may be used to calculate the location of a space object revolving about the Earth in TEME coordinates. FIG. 5 illustrates a perspective view of Earth-Centered Earth-Fixed (ECEF) coordinates 50 in relation to latitude $\varphi$ and longitude $\lambda$, according to an example implementation of the present disclosure. As shown in FIG. 5, it may be converted into the Earth-Centered, Earth-Fixed (ECEF) Cartesian x, y, z coordinate system as a function of time.

In some implementations, an example of satellite ephemeris information converted into ECEF format for the Telestar-19 satellite is shown below in Table 1.

TABLE 1

| Epoch (day, hr, min, sec) | X[km] | Y[km] | Z[km] | dX/dt[km/s] | dY/dt[km/s] | dZ/dt [km/s] |
|---|---|---|---|---|---|---|
| 2018 Oct. 26 02:00:00.000 | 19151.529 | −37578.251 | 17.682 | −0.00151 | −0.00102 | −0.00106 |
| 2018 Oct. 26 02:05:00.000 | 19151.073 | −37578.556 | 17.359 | −0.00152 | −0.00101 | −0.00109 |
| 2018 Oct. 26 02:10:00.000 | 19150.614 | −37578.855 | 17.029 | −0.00154 | −0.00099 | −0.00112 |
| 2018 Oct. 26 02:15:00.000 | 19150.150 | −37579.151 | 16.690 | −0.00155 | −0.00098 | −0.00114 |

Specifically, given a specific point in time, it is straightforward to calculate the satellite location by interpolation. The example given above refers to a GEO satellite, in which the epoch interval is 5 minutes. For LEO satellites, the intervals may be much shorter (e.g., on the order of seconds).

Examples of some selected terms are provided as follows.
gNB: This may mean a node that provides NR user plane and control plane protocol terminations towards the UE and is connected to the 5GC via the NG interface.
Msg1: This may mean a preamble transmission of the RA procedure for a 4-step RA type procedure.
Msg3: This may mean a first scheduled transmission of the RA procedure.
MsgA: This may mean preamble and payload transmissions of the RA procedure for a 2-step RA type procedure.
MsgB: This may mean a response to MsgA in the 2-step RA procedure. MsgB may include one or more responses for contention resolution, one or more fallback indications, and a backoff indication.
Numerology: This may correspond to one subcarrier spacing in the frequency domain. By scaling a reference subcarrier spacing by an integer N, different numerologies may be defined.
LEO: This may mean an orbit around the Earth with an altitude between 300 km and 1500 km.
NTNs: This may mean networks, or segments of networks, using an airborne or space-borne vehicle to carry a transmission equipment relay node or a base station (BS).
NTN-gateway: This may mean an Earth station or a gateway being located at the surface of Earth and providing sufficient RF power and RF sensitivity for accessing a satellite. An NTN Gateway is a transport network layer (TNL) node.

Satellite: This may mean a space-borne vehicle carrying a bent pipe payload telecommunication transmitter or a regenerative payload telecommunication transmitter, placed into Low-Earth Orbit (LEO), Medium-Earth Orbit (MEO), or Geostationary Earth Orbiting (GEO).

HARQ information: This may be used for Downlink Shared Channel (DL-SCH), Uplink Shared Channel (UL-SCH), or Sidelink Shared Channel (SL-SCH) transmissions and may include a New Data Indicator (NDI), Transport Block Size (TB S), Redundancy Version (RV), and HARQ process ID.

Dormant BWP: This may be one of the downlink (DL) Bandwidth Parts (BWPs) configured by the network via dedicated RRC signaling. In the dormant BWP, the UE may stop monitoring PDCCH on/for the Secondary Cell (SCell) and continue performing CSI measurements, Automatic Gain Control (AGC), and beam management, if configured.

PDCCH occasion: This may mean a time duration (e.g., one symbol or a consecutive number of symbols) during which the MAC entity is configured to monitor the PDCCH.

Serving Cell: This may mean a PCell, a PSCell, or an SCell.

Timing Advance Group (TAG): This may mean a group of Serving Cells that may be configured by RRC messaging, where the cells with a UL configured may use a same timing reference cell and a same Timing Advance value. A Timing Advance Group containing the SpCell of a MAC entity is referred to as a Primary Timing Advance Group (PTAG), whereas the term Secondary Timing Advance Group (STAG) refers to other TAGs.

Figure 6:
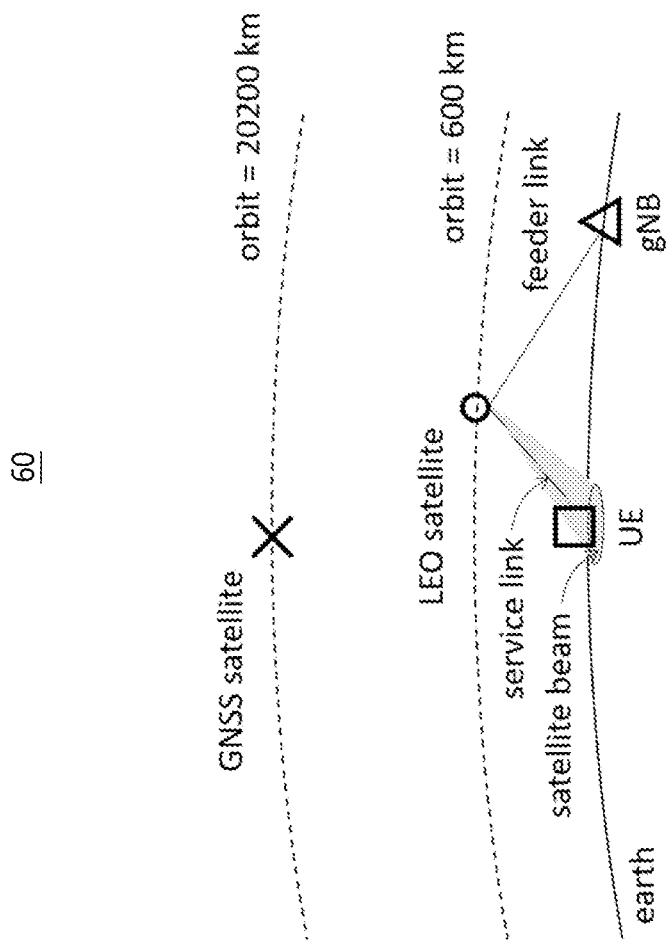
FIG. 6 illustrates a schematic diagram of an NTN with a low-Earth orbit (LEO) satellite of transparent payload at an orbit of 600 kilometers (km), according to an example implementation of the present disclosure.

FIG. 6 illustrates a schematic diagram of an NTN 60 with an LEO satellite of transparent payload at an orbit of 600 km, according to an example implementation of the present disclosure. Specifically, NTN may refer to NWs, or segments of NWs, using a spaceborne vehicle for transmission, e.g., LEO satellites or GEO satellites. As shown in FIG. 6, a satellite access NW based on a satellite with a transparent payload is introduced.

In some implementations, the NTN 60 may include the following elements:

A Ground (or 'Earth') Station including a Satellite-gateway and a Telemetry, Tracking and Command (TTC) unit. A Monitoring unit TTC link is out of the scope of the 3GPP realm.

One or several Satellite-gateways (Sat-gateways) may be attached to a BS Base Band Unit (BBU) or a gNB that connects the NTN to a Core Network/Application Server. Node BBUs are close to Sat-gateways (e.g., either co-located or a few kilometers away). Antenna diversity may be required depending on geographical location and feeder-link frequency band.

The satellite may be GEO or Non-GEO, and the satellite may be a part of a Satellite Constellation to ensure continuous services through one or several Sat-gateways. A Satellite Constellation Controller may provide each BS with satellite system data (e.g., satellite ephemeris information, satellite position, satellite velocity, etc.). The Satellite Constellation Controller may be linked to the TTC unit at least to retrieve the relevant satellite information, where the link to the TTC unit is implementation-dependent on or beyond the scope of 3GPP.

A feeder link, which is a radio link conveying information for a satellite mobile service between a Sat-gateway and the satellite.

A service link or radio link between the UE and the satellite.

A satellite, which implements a transparent payload. A transparent payload may perform radio frequency filtering, frequency conversion, and amplification. Hence, a waveform signal repeated by the payload is unchanged except for frequency translation and transmission power, which is set up according to the reference scenario (e.g., a GEO or LEO satellite) and associated link budget.

The satellite may generate several spot-beams over a given service area bounded by its FOV or footprint. The footprints of the spot-beams may have an elliptic shape. The FOV of a satellite may depend on the onboard antenna design/configuration and the minimum elevation angle. The beamforming may be performed on the satellite or on the ground.

A UE is served by the satellite within the targeted service area and may be capable of Global Navigation Satellite System (GNSS) reception.

Specifically, GNSS refers to the standard generic term for satellite navigation systems that provide autonomous geospatial positioning with global coverage. The GNSS may include, for example, the Global Positioning System (GPS), GLONASS, Galileo, Beidou, and other regional systems, and is usually operated at an orbit of 20200 km.

K_Offset Update

In some implementations, the following may be introduced:

For updating K_offset after initial access, at least one of the following options is supported:

Option 1: RRC reconfiguration.

Option 2: MAC CE

Specifically, the intention to update K_offset in an RRC CONNECTED state is to reduce scheduling delay due to lack of a UE-gNB RTT during the initial access. After a UE-specific TA is reported to a NW, then updating K_offset is feasible and beneficial. The remaining issue is that updating K_offset should be performed via an RRC reconfiguration or a MAC CE.

However, if updating K_offset is performed via the RRC reconfiguration, K_offset may not be applied due to a partial failure of the received configuration. If updating K_offset is performed via the MAC CE, it is unclear how the UE may behave for multiple active UL BWPs, a UL BWP change, and SPS PDSCHs. When UL and DL timing are aligned at a satellite, a K_mac value is provided for indicating MAC CE action time. It is unclear how to update K_mac and any association with K_offset. If K_mac is updated via the MAC CE, then it is unclear whether the MAC CE action time corresponding to HARQ-ACK for the MAC CE may be updated.

Solutions

In some implementations, if K_offset is provided by an RRC message from a gNB to an NTN UE, the UE may apply K_offset with legacy scheduling offset k1 or k2 provided by the gNB to determine UL timing for a PUCCH transmission or PUSCH transmission. In one example, if the UE receives scheduling offsets k0 and k1 from a DCI format in a slot n and K_offset from an RRC message before the slot n, the UE may receive a PDSCH in a slot n+k0 and provide a HARQ feedback in a slot n+k0+k1+K_offset.

In some implementations, if K_offset is used to deal with TA and the TA has a concept of TAG that cells may share the same TA value, K_offset may have an association with the TAG. K_offset may be associated with a TAG ID. In one example, an RRC message may include K_offset and the TAG ID. The TAG ID may indicate a cell list that K_offset may be applied, where the indication of the TAG ID may be done implicitly. The UE may apply K_offset on multiple cells if these cells are in the same TAG, e.g., sharing the same TAG ID.

In some implementations, if K_offset is optional, K_offset may be set by 'Need codes'. If K_offset is set to 'Need M', a value of a field corresponding to K_offset may need to be stored by the UE (i.e., maintained) when the field is absent. If K_offset is set to 'Need R', the value of the field corresponding to K_offset may need to be released by the UE when the field is absent. If K_offset is set to 'Need N', the UE may take no action when the field of K_offset is absent (e.g., the UE may not need to maintain any existing value of the field). If K_offset is set to 'Need S', the UE may apply K_offset in SI upon the received field of K_offset is absent.

In some implementations, if K_offset is a mandatory DL field and if an RRC message includes a field indicating that the UE does not comprehend, the UE may treat the rest of the message(s) as if the field is absent. The UE may delete the uncomprehended message including K_offset. If K_offset is treated as absent, the UE may apply the stored (i.e., maintained) K_offset. If there is no stored K_offset in the RRC CONNECTED state, the UE may apply the same K_offset used for Msg3 during the initial access or for an ACK of MsgB. If K_offset is absent during the initial access, NTN UEs may not access or camp on this cell.

In some implementations, if K_offset is provided by the MAC CE from a gNB to an NTN UE, the UE may apply K_offset on DL scheduling after the MAC CE action time based on reception timing of a DCI format for the DL scheduling. If the DCI format is received before a new K_offset is activated, e.g., a slot of HARQ-ACK for the new K_offset+3 ms, the corresponding scheduling to the DCI format is based on the stored K_offset. If the DCI format is received after the new K_offset is activated, the corresponding scheduling is based on the new K_offset.

In some implementations, if a first K_offset has been provided by an RRC message from a gNB to an NTN UE, the UE may apply the first K_offset with legacy scheduling offset k1 or k2 provided by the gNB to determine UL timing for a PUCCH transmission or PUSCH transmission. In one example, if the UE receives scheduling offset k0 and k1 from a DCI format in a slot n and the first K_offset from an RRC message before the slot n, the UE may receive a PDSCH in a slot n+k0 and provide a HARQ feedback in a slot n+k0+k1+the first K_offset. In another example, if the UE receives a second K_offset by a MAC CE from the gNB, the UE may discard a stored value derived from the first K_offset and apply the second K_offset.

In some implementations, the MAC CE being applied for indicating K_offset may include multiple fields, where each field may be associated with one TAG. In one example, the MAC CE may include four fields. In one implementation, the K_offset being received from a broadcast RRC message may be applied by the UE for all UL transmissions regardless of the TAG. In another implementation, the UE may apply K_offset for a UL transmission associated with one TAG if the UE does not receive K_offset via the MAC CE.

In some implementations, for an SPS, the scheduling offset for a HARQ feedback is determined when the SPS is activated. As such, whether to update K_offset may be determined by a slot number of a PDSCH scheduled by the SPS. If the PDSCH is received before activating the new K_offset, the UE may apply the stored K_offset. If the PDSCH is received after activating the new K_offset, a HARQ feedback may be transmitted based on the new K_offset. In other words, such UE behaviors may be performed/applied if K_offset is by received via an RRC message or a MAC CE.

In some implementations, for an SPS, if the K_offset is not allowed to be updated after the SPS is activated, the UE may terminate the SPS if there is not enough processing time for a PDSCH due to a small value of K_offset. Specifically, the termination timing may be at least one of the following:

1) UE may not feedback a HARQ-ACK for an SPS PDSCH if there is no sufficient processing time for the SPS PDSCH;
2) the SPS may be deactivated after activating a new K_offset, the SPS configuration may be maintained, and the gNB may be reactivated again if the SPS is requested; and
3) the SPS may be deactivated after the UE stops providing a HARQ-ACK due to insufficient processing time.

In some implementations, if the UE changes an active UL BWP between the reception time of K_offset and a time of applying a corresponding adjustment for UL transmission timing, the UE may determine a value of K_offset based on an SCS of the new active UL BWP. If the UE changes an active UL BWP after applying an adjustment for the UL transmission timing, the UE may assume the same value of K_offset before and after activating the UL BWP change.

In some implementations, if the UE has multiple active UL BWPs in the same TAG, including UL BWPs in two UL carriers of a serving cell, a value of K_offset may be related to the largest SCS of the multiple active UL BWPs if K_offset is not associated with a cell ID.

In some implementations, if K_mac is provided by an RRC message from a gNB to an NTN UE, the UE may apply K_mac to determine a MAC action time when a MAC CE command is received. In one example, if the UE receives a MAC CE activation command, the UE may apply the activation command in a first slot that is after a slot k+N (μ)+K_mac slot subframe, where k is a slot where the UE may transmit a PUCCH with HARQ-ACK information for the PDSCH providing the activation command and N is a function of SCS configuration for a PUCCH denoted by μ. The active BWP is defined as the active BWP in the slot when the activation command is applied.

In some implementations, if K_mac is utilized from K_offset, K_mac may be provided only if a common TA is provided. K_mac may be associated with a TAG ID, e.g., an RRC message including K_mac and a TAG ID, where the TAG ID indicates a cell list to which K_mac may be applied. Implicitly, the UE may apply K_mac on multiple cells if these cells are in the same TAG.

Since using K_mac is a special case of using K_offset when UL and DL timing are misaligned at the gNB, the above implementations for K_offset may be applied directly by replacing K_offset with K_mac.

Validity Timer for UE-Specific TA and Common TA

In some implementations, a validity timer configured for a UE-specific TA may define a maximum time during which the UE can track the RTD on the service link without having acquired new satellite ephemeris information to be used for UE-specific TA estimation. The properties are given as follows: 1) this timer may be restarted each time the UE receives new satellite ephemeris information, and 2) the UE may assume that it has lost UL synchronization if this timer expires, and new satellite ephemeris information is not available.

There may be some problems as a result of this approach. If the UE fails to maintain the UE-specific TA on the service link and the UE-specific TA timer is still valid (e.g., the valid time is around 10 seconds), the UE still needs to wait for another 10 seconds to update its UE-specific TA even when the UE has received a PDCCH order (e.g., the NW indicates UE has been unsynchronized).

Solutions

In some implementations, if the UE-specific TA timer is introduced, when to start, when to stop, and what to do at its expiry should be defined. The timer may start or restart when a TA report is sent to the NW, when the UE receives a TA report request, or when the UE sends a HARQ-ACK after receiving the TA report request. The timer may stop when the UE receives an indication from the NW or when the UE sends an indication to the NW. If the timer expires, the UE may assume UL transmission is unsynchronized.

In some implementations, the TA validity timer may be (re-)started: 1) when the UE triggers a TA report or generates a TA report MAC CE; or 2) when the UE receives a (re-)configuration for the TA validity timer (e.g., via an RRC message for the UE-specific TA timer and/or SI for a common TA timer). The above implementation may also be used for a common TA timer.

In some implementations, the TA validity timer may be stopped: 1) when the UE performs cell (re)selection and camps on another cell (or the cell which is not in the provided cell list, which is because the TA validity timer may be cell-specific); or 2) when the legacy TA timer expires. The above implementation may also be used for the common TA timer.

In some implementations, if the timer expires, the UE may: 1) initiate an RA procedure to request a new valid TA; 2) perform an SI request procedure, e.g., to require new satellite ephemeris information or a common TA (as such, the UE may further indicate information that a new TA is not valid via a preamble/PRACH/Msg1/MsgA/Msg3 (this mechanism is also used for LBT and BFR)); or 3) consider the legacy TA timer as expired. The above implementation may also be used for the common TA timer.

In some implementations, if a common TA timer is introduced, when to start, when to stop, and what to do at expiry is needed. The timer may start or restart when satellite ephemeris information is received from the NW, when a common TA value is received in SI from the NW, or when the common TA action time is associated with a HARQ-ACK. The timer may stop when the UE receives an indication from the NW or when the UE sends an indication to the NW. If the timer expires, the UE may assume UL transmission is unsynchronized.

In some implementations, the UE may only assume that the UL is unsynchronized for the cell(s) which is associated with the new TA timer, e.g., the UE may keep performing UL for other cells.

In some implementations, the legacy timer may be defined as a timeAlignmentTimer (per TAG) that controls how long the MAC entity may consider the serving cells belonging to the associated TAG to be UL time-aligned.

In some implementations, the UE-specific TA timer, the common TA timer, and the legacy timer may have an association, e.g., 1) they may share the same TAG or they may be configured with a cell list; or 2) once one of them is expired, all of them may be expired. When one of the timers being associated with a Primary Timing Advance Group (PTAG) is expired, the UE may flush all HARQ buffers for all serving cells; notify via RRC message to release PUCCH for all serving cells, if configured; notify RRC to release SRS for all serving cells, if configured; clear any configured DL assignments and configured UL grants; clear any PUSCH resource for a semi-persistent CSI report; consider all running timeAlignmentTimers as expired; and maintain an NTA, as defined in TS 38.211, of all TAGs.

In some implementations, if the common TA exists, the NW may provide a list of cells. The UE may apply the same common TA for the indicated cells, which may be done by associating with a TAG ID or creating a new common TA group. The common TA group may imply that these cells are provided via the same feeder link by a satellite. The common TA group ID may be a satellite ID.

In some implementations, during the RACH procedures, the UE may receive a TA through a RAR or MsgB. Once the UE obtains the TA, the UE may adjust the timing of UL signals and start/restart the legacy TA timer. If either one of the TA timers expires, the TA may be invalid and the UE may not perform any UL transmission except the RA Preamble and MsgA transmission.

In some implementations, for an RRC_IDLE state and/or an RRC_INACTIVE state, if a common TA is provided in a SIB (e.g., a SIB1), and if a common TA update triggers an SI change indication, the UE may update the common TA by re-acquiring a SIB after receiving a short message in its paging occasion. After receiving a new common TA or satellite emphasis information, the UE may start or restart the common TA timer with a default value, e.g., 3 mins.

In some implementations, a new indication (e.g., a PEI) that is introduced in 3GPP Rel-17 power-saving WI may be used for indicating a new common TA or satellite emphasis information when the UE is in the RRC_IDLE/RRC_INACTIVE state. The PEI is a DCI indication that may be indicated in the RRC_IDLE/INACTIVE state to be more dynamic. The PEI may be used to trigger the UE to update the TA and to request an SIB for the common TA.

TA Report

In some implementations, the intention to support a TA report may be for UL scheduling adaptation. A related agreement has been achieved below (e.g., RAN1 #104-e), where the UL scheduling adaptation literately means a K_offset update after an initial access. Agreement: Update of K_offset after an initial access is supported.

Noticeably, TA report may not be essential to support the K_offset update. The NW may simply update K_offset based on the maximum RTT given a cell location, which may increase system latency, and the NW may lose a UE-gNB RTT.

To protect the privacy of UEs, providing measurement reports before AS security activation may be avoided. Also, it is unclear how to quantize a UE-calculated TA for the TA report. A floor function or a rounding function may be prevented.

Solutions

In some implementations, the UE may receive a TA report configuration or a TA report initiation via an RRC message or other signaling from the NW. The UE may feedback a UE-calculated TA (i.e., a UE-specific TA) or an applied TA for UL transmission to the NW based on the configuration or the initiation.

In some implementations, a TA report configuration may be sent before the AS security activation, e.g., in SI or an RRC message. In addition, to protect the privacy of the UEs, the TA report may be only sent from the UE after successfully initiating an AS security activation. The UE may feedback a calculated TA or an applied TA via an RRC message after the AS security activation, e.g., at least after delivery of Msg3.

In some implementations, the AS security includes integrity protection and ciphering of RRC signaling (e.g., SRBs) and user data (e.g., DRBs). The RRC message may be used to configure AS security parameters.

In some implementations, the TA report includes at least one TA value(s) that the UE may calculate or apply for UL transmission, where the unit of the TA value(s) may include at least one of a millisecond, a slot number, and an index. In addition, quantization may be needed to compress the information no matter what unit is configured for the TA value(s). The UE may use a ceiling function (CEIL) to map a parameter X to a least integer that is greater than or equal to the parameter X. In one example, if the UE applies 2.4 milliseconds of TA for UL transmission, the ceiling function may be CEIL(2.4 ms)=3 ms and the UE may feedback 3 ms in a TA report to the NW.

In some implementations, the TA report may include a TAG ID or a cell list when the UE applies the same TA value for multiple cells or the TAG. If the UE has multiple active UL BWPs in the same TAG, including UL BWPs in two UL carriers of a serving cell, the TA report value may be related to the largest SCS of the multiple active UL BWPs if the TA report is not associated with a cell ID.

Figure 7:
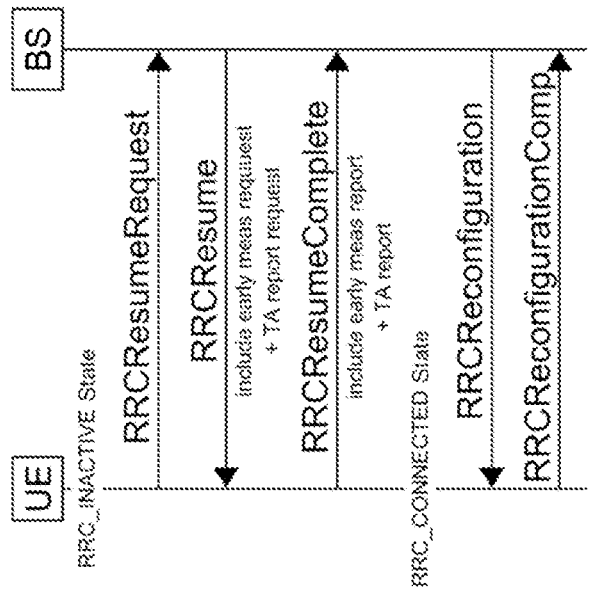
FIG. 7 illustrates a communication diagram of a TA report based on an early measurements report in an RRCResume-Complete message, according to an example implementation of the present disclosure.

FIG. 7 illustrates a communication diagram of a TA report 70 based on an early measurements report in an RRCResumeComplete message, according to an example implementation of the present disclosure. As shown in FIG. 7, the TA report may be carried via an early measurement report. The UE may receive a TA report request in an RRC_INACTIVE state by an RRC message including an RRCResume. The UE may receive the TA report request (while the UE is in the RRC_INACTIVE state) by an RRC message including the RRCResume. The TA report may be carried via an RRCREconfigurationComp message in an RRC CONNECTED state after the UE receives a TA report request by an RRC message including an RRCReconfiguration or another RRC message after the RRCReconfiguration. The TA report may be carried via the RRCREconfigurationComp message in the RRC CONNECTED state after the UE receives a TA report request by an RRC message including the RRCReconfiguration or another RRC message after the RRCReconfiguration.

As shown in FIG. 7, the TA report may be carried via an early measurement report mechanism. In some implementations, the UE may receive one indication from a serving BS (e.g., one gNB or one eNB) which indicates that the serving BS (or the serving cell) supports TA report delivery from the UE (e.g., via broadcasting system information, like a SIB 1). In some implementations, the serving BS may transmit a TA report request/inquiry message (e.g., via an RRCResume message) to the UE to request the TA report from the UE. After receiving the TA report request from the serving BS, the UE may transmit the TA report in the RRCResumeComplete message. In some implementations, the serving BS may not transmit one TA report request directly. Instead, the UE may indicate a 'TA report available=true' indicator in the RRCResumeComplete message to the serving BS. After receiving the 'TA report available=true' indicator via the RRCResumeComplete message, the serving BS may transmit the TA report request/enquiry message to the UE in one of the following DL UE-specific control signaling (e.g., an RRCReconfiguration message) to instruct the UE to transmit the TA report to the serving BS.

In some implementations, a TA report mechanism may also be supported by UEs in the RRC_IDLE state. First, the TA report may be carried via the early measurement report mechanism. In some implementations, the UE may receive one indication from the serving BS (e.g., one gNB or one eNB) which indicates that the serving BS (or the serving cell) supports TA report delivery from the UE (e.g., via a broadcasting system information, like SIB 1). In some implementations, the serving BS may transmit one TA report request/inquiry message (e.g., via an RRC Setup message) to the UE to request the TA report from the UE. After receiving the TA report request from the serving BS, the UE may transmit the TA report in the RRCSetupComplete message. In some implementations, the serving BS may not transmit one TA report request directly. Instead, the UE may indicate a 'TA report available=true' indicator in the RRCSetupComplete message to the serving BS. After receiving the 'TA report available=true' indicator via the RRCSetupComplete message, the serving BS may transmit the TA report request/inquiry message to the UE in one of the following DL UE-specific control signaling (e.g., an RRCReconfiguration message) to instruct the UE to transmit the TA report to the serving BS.

In some implementations, the UE may not trigger the TA report mechanism during an RRC resume procedure or an RRC establishment procedure if the serving BS does not broadcast an indication for 'TA report support' in one SIB 1.

DL Frequency Compensation on the Service Link

In some implementations, the intention to provide DL frequency compensation from the NW on the service link is to have the UE perform UL frequency compensation based on the RS and assistance information. For Earth-moving cells, providing a fixed value of DL frequency compensation on the service link is feasible. In comparison, for Earth-fixed cells, the DL frequency compensation on the service link may be varying in time. Providing a fixed location in a cell may be practical while considering signaling overhead. In the below proposal, RAN2 has agreed to provide a reference location of the cell for the location-based CHO execution, and accordingly, RAN1 may consider leveraging this solution for Earth-fixed cells.

Agreement: the location in location-based CHO execution triggering for NTN may describe the distance between the UE and the reference location of the cell (e.g., a serving cell or a target cell). For further study, it may focus on what is the reference location of the cell (e.g., a cell center or other positions) and how the reference location may be provided to the UE.

Solutions

In some implementations, to solve DL Doppler shift due to satellite movement, DL frequency pre-compensation at a gNB may be needed. The gNB may pre-compensate Doppler shift impact on DL transmission, including all DL channels, e.g., SSB, PBCH, PDSCH, and PDCCH, by aiming UEs that are located at the cell center to have no Doppler frequency shift. The pre-compensation value may be cell-specific to be provided to the UEs via SI or another broadcast mean in the cell.

In some implementations, an NTN may have different deployed scenarios depending on antenna capability of satellites. There are three types of scenarios including: 1) an Earth-moving cell may include one NTN provided by non-GEO satellites with fixed antenna beams at the satellites; 2) an Earth-fixed cell may include one NTN via GEO satellites with a fixed location in the sky and provide fixed-cell service on the ground; or 3) a quasi-Earth-fixed cell may include one NTN via non-GEO satellites with adjustable antenna beams at the satellite. As such, the UE may identify one of these types of scenarios by receiving an indication from the NW in SI, or based on the information provided by the NW, or based on when a cell is going to stop serving the area and/or corresponding timing information (e.g., a timer or any absolute timing value) about a new upcoming cell.

In some implementations, for Earth-moving cells, providing a fixed value of DL frequency pre-compensation on the service link at the NW may be supported to enhance UL frequency pre-compensation at the UE. One UE in the NTN may receive a DL frequency pre-compensation value used by a gNB for DL transmission via SI, e.g., a RACH-ConfigCommon in SIB1, or via an RRC message, e.g., a RACH-ConfigDedicated in one RRC message. The UE may apply the pre-compensation value to adjust the UL transmission frequency combining with other assistant information from the gNB, e.g., an RS, satellite ephemeris information, and a timer to indicate whether the value is still valid (if the timer is running, it is valid), to transmit at least a PRACH preamble and other UL transmission, e.g., a SRS, a PUCCH, and a PUSCH.

In some implementations, for Earth-fixed or quasi-Earth-fixed cells, leveraging a fixed reference location of a cell for CHO to indicate DL frequency pre-compensation on the service link at the NW may be supported. The UE in the NTN may receive a reference location that indicates a cell center, a point with the minimum RTT and/or a point with the maximum RTT of the cell. This information may be used for CHO and to derive a DL frequency pre-compensation value for the target cell, combining with satellite ephemeris information of the target satellite from the serving gNB and the UE location from a GNSS receiver. The DL frequency pre-compensation value may be used to adjust UL transmission, e.g., a PRACH transmission to a target cell from the current satellite (i.e., the same one as the serving cell) or a new satellite based on a CHO configuration.

In some implementations, if a value of a field of DL frequency pre-compensation or the reference location is optional, the value of the field of the DL frequency pre-compensation or the reference location may be set by 'Need codes'. If 'Need codes' is set to 'Need M', a content of a field carried by an RRC message may need to be stored by the UE (e.g., maintained) when the field of the DL frequency pre-compensation or the reference location is absent. If 'Need codes' is set to 'Need R', the content of the field corresponding to the DL frequency pre-compensation or the reference location may need to be released by the UE when the field is absent. If 'Need codes' is set to 'Need N', the UE may take no action when the field of the DL frequency pre-compensation or the reference location is absent (i.e., the UE may not need to maintain any existing value of the field).

In some implementations, if a field of DL frequency pre-compensation or reference location is a mandatory DL field and if the RRC message includes an additional field indicating that the UE does not comprehend, the UE may treat the rest of the message(s) as if the additional field is absent. The UE may delete the uncomprehended message. If the field is treated as absent by the UE, the UE may apply the stored/maintained value. If there is no stored/maintained value, the UE may apply the same value used for Msg1 or MsgA during the initial access. If the field is absent during the initial access, the value of DL frequency pre-compensation is set to zero or a minimum Doppler shift based on satellite orbits; alternatively, the UE in the NTN may not access or camp on this cell, or the UE in the NTN may not compensate the Doppler shift with any absolute value on the service link for the UL transmission, e.g., a PRACH transmission, and the UE may only pre-compensate partial Doppler shift on the service link based on the RS measurement. If the value of DL frequency pre-compensation is zero or absent, the UE may not use the satellite ephemeris information and the UE location to predict the Doppler shift on the service link, and only the RS measurement may be allowed for, for example, an SSB, a CSI-RS, and a PTRS.

Long UL Transmission on NPUSCH/NPRACH

In some implementations, with MCL>164 dB, a maximum PUSCH transmission may be up to 40.96 seconds (s). If a delay drift rate is up to 93 microseconds per second (μs/s), the delay after 256 milliseconds (ms) may vary by as much as 23.8 μs. As such, CP and ICI of the PUSCH may be broken, to cause a loss of orthogonality of the OFDM waveform, e.g., 4.7 μs. Thus, one proposal is that the UE may pre-compensate per N time units for a long PRACH, where pre-compensation performed by the UE does not vary within a block of N time units. However, there are two remaining issues: 1) an overlap between two consecutive blocks of N time; and 2) restriction on a TA update in a duration of repetitions according to solutions/mechanisms specified in the current specification.

Solutions

In some implementations, a UE may receive a UCG configuration provided by one gNB, indicating an X-ms gap every Y ms of UL transmission. If the UE transmits a UL transmission of more than Y ms, the UE may insert an X-ms gap after sending Y ms. During this X-ms gap, the UE may adjust UL transmission timing based on a GNSS-acquired UE location, satellite ephemeris information in a SIB, timing drift rate, and a TAC if received or requested from the gNB. The gNB may indicate whether the UE can adjust the UL transmission timing based on the UE location and satellite ephemeris information in an RRC_IDLE state or an RRC CONNECTED state, including NPUSCH transmission and NPRACH transmission.

In some implementations, if the UCG configuration is absent, the UE may adjust the UL transmission timing when an error of the UL transmission timing between the UE and the reference timing exceeds ±Te, where Te is a timing error specified in TS 38.133, and the UE may be required to adjust such UL transmission timing to correct such error within ±Te. The reference timing may be before the DL transmission timing of the reference cell. The reference timing is derived based on a combination of a closed-loop TA control and an open-loop TA control, where the closed-loop TA control is based on TA commands, and the open-loop TA control is based on UE location via GNSS, satellite ephemeris information via one SI, and a TA drift rate or a TA drift rate variant via one SI.

In some implementations, all above adjustments made to the UL transmission timing of the UE may comply with following rules: 1) a maximum amount of magnitude of a timing change in one adjustment may be Tq, where Tq is a maximum Autonomous Time Adjustment Step specified in TS 38.133; 2) a minimum aggregation adjustment rate may be Tp per second, where Tp is a minimum Aggregate Adjustment rate specified in TS 38.133; and 3) a maximum aggregation adjustment rate may be Tq per 200 ms. The UE may not autonomously adjust the UL transmission timing during an ongoing repetition period other than at initial transmission, except for receiving an indication or a request from the gNB.

Channel Raster

In some implementations, in the case of IoT over NTN service in an S-band (e.g., at 2 gigahertz (GHz)) with a UE oscillator error of 20 parts per million (ppm) (in an NB-IoT UE) and a residual Doppler value of 16.14 ppm, a maximum FO may be up to 72.28 kilohertz (kHz), which is much larger than half of the current channel raster, e.g., 100 kHz. As such, the following issues should be considered: 1) a new channel raster with a step size increased to be greater than 100 kHz; and 2) (part of) ARFCN-indication-in-MIB. However, in the current specification, the channel raster may be 100 kHz for all bands and an offset of NB-IoT Channel Number to DL EARFCN may be provided, which means the offset should be updated if the channel raster is increased.

Solutions

In some implementations, a UE in the NTN may receive a SIB, e.g., a SIB27, or an RRC message, e.g., a Carrier-ConfigDedicated-NB, including relevant information only for inter-RAT cell selection e.g., assistance information about NB-IoT frequencies for cell selection. The SIB27 or NTN-SIB includes a carrierFreqOffset-r18 field that may provide an offset of the NB-IoT channel number to EARFCN. Specifically, a value as v-10 means −10, a value as v-9 means −9, and so on. Values as v-8dot5, v-4dot5, v3dot5, and v7dot5 are only applicable for a carrier in a TDD band. If the carrierFreqOffset-r18 field is absent, the UE may read a legacy carrierFreqOffset field in SIB27. If both parameters carrierFreqOffset-r18 and carrierFreqOffset are provided, the UE may ignore the legacy carrierFreqOffset.

In some implementations, one IE ChannelRasterOffset-NB is used to specify an NB-IoT offset from an LTE channel raster, where a unit is kHz in set {−7.5, −2.5, 2.5, 7.5}. For NTN UEs, a new IE, e.g., a ChannelRasterOffset-NB-r18, is used to provide a larger range of offset values, e.g., from −15 kHz to 15 kHz. If the ChannelRasterOffset-NB-r18 is absent, the UE may read the legacy ChannelRasterOffset-NB. If both parameters carrierFreqOffset-r18 and carrierFreqOffset are provided, the UE may ignore the legacy carrierFreqOffset.

EDT Enhancement

In some implementations, the intention to support EDT is for intermittent delay-tolerant small packet transmission in a case of discontinuous satellite coverage. The EDT may allow one uplink data transmission optionally followed by one DL data transmission during an RA procedure. The EDT includes CP-EDT and UP-EDT. For CP-EDT, UL/DL user data may be transmitted in NAS messages without a transition to the RRC CONNECTED state. For UP-EDT, UL/DL user data may be transmitted on a DTCH without a transition to the RRC CONNECTED state.

Figure 8:
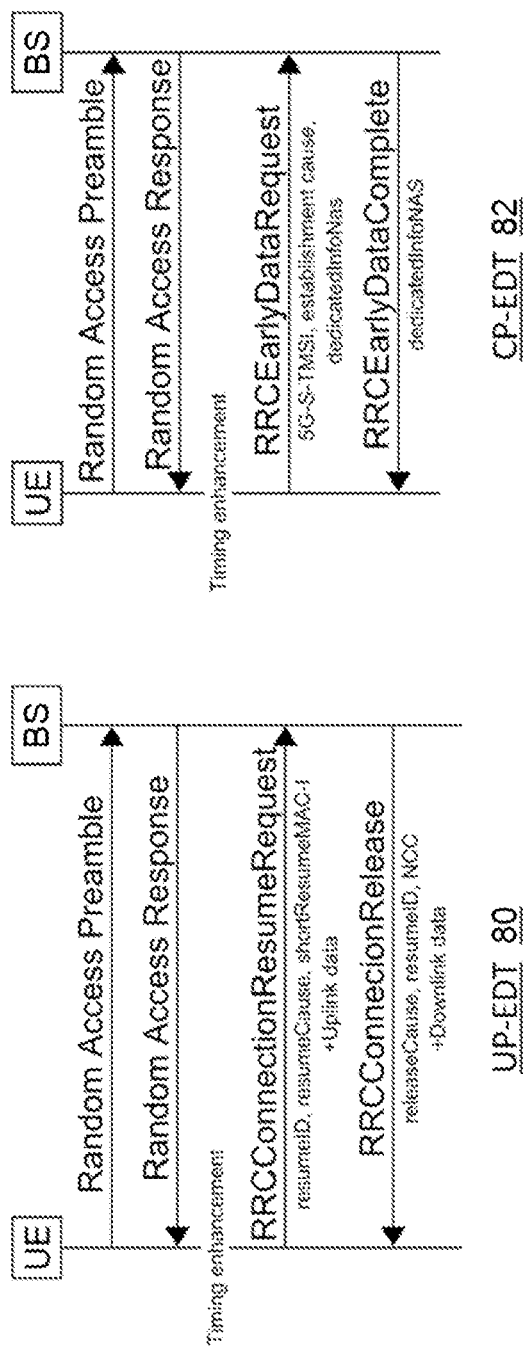
FIG. 8 illustrates a communication diagram of a control plane early data transmission (CP-EDT) procedure and a user plane early data transmission (UP-EDT) procedure, according to an example implementation of the present disclosure.

FIG. 8 illustrates a communication diagram of a UP-EDT procedure 80 and a CP-EDT procedure 82, according to an example implementation of the present disclosure. As shown in FIG. 8, user data may be transmitted via Msg3 of the RA procedure, where the NW (e.g., the eNB) may schedule Msg3 with sufficient UE processing time.

In some implementations, in one NTN, the UE may adjust the UL transmission timing for the Msg3 transmission such that the BS (e.g., an eNB or a gNB) may receive Msg3 within a reception timing error of the OFDM-CP limit. This adjustment may be unknown by the BS before the TA report. Thus, Msg3 may need an additional time, e.g., a scheduling offset, for UL timing adjustment.

Solutions

In some implementations, if a UE is using edt-Parameters provided by a gNB, indicating the EDT, for the UP-EDT procedure 80 (e.g., the NW may indicate whether the UE can initiate the UP-EDT procedure 80), the UE may send an RRCConnectionResumeRequest based on: (1) a scheduling offset K_offset provided in one SI, (2) an NB-IoT DL subframe n being the last subframe in which an NPDSCH associated with the Narrowband Random Access Response Grant is transmitted, and (3) a scheduling delay field provided in the Narrowband Random Access Response Grant (e.g., Msg2). For the CP-EDT procedure 82 (e.g., the NW may indicate whether the UE can initiate the CP-EDT procedure 82), the UE may send the RRCEarlyDataRequest based on: (1) a scheduling offset K_offset provided in one SI, (2) an NB-IoT DL subframe n as the last subframe in which the NPDSCH associated with the Narrowband Random Access Response Grant (NB-RAR) is transmitted, and (3) a scheduling delay field provided in the NB-RAR given in Msg2. Based on the scheduling, the UE may apply a TA value to adjust UL transmission timing for the Msg3 transmission. K_offset applied for the EDT Msg3 may be different from K_offset applied for Msg3. K_offset may be configured per CE level. K_offset may be configured in the edt-Parameters. The UE may determine a number of repetitions applied for the EDT Msg3 while considering the TA applied for the EDT Msg3 and K_offset. In one example, the UE may determine a number of NPUSCH repetitions that do not result in a reception timing error of an NPUSCH repetition exceeding the OFDM-CP limit. The UE may select the TB S for the EDT Msg3 while considering the TA applied for the EDT Msg3 and K_offset. In one example, the UE may determine a number of NPUSCH repetitions that do not result in a reception timing error of a NPUSCH repetition exceeding the OFDM-CP limit, and the TBS for the EDT Msg3 may be selected as the maximum TBS being multiplied by a ratio of a selected number of NPUSCH repetitions to a maximum number of NPUSCH repetitions that may be transmitted.

Figure 9:
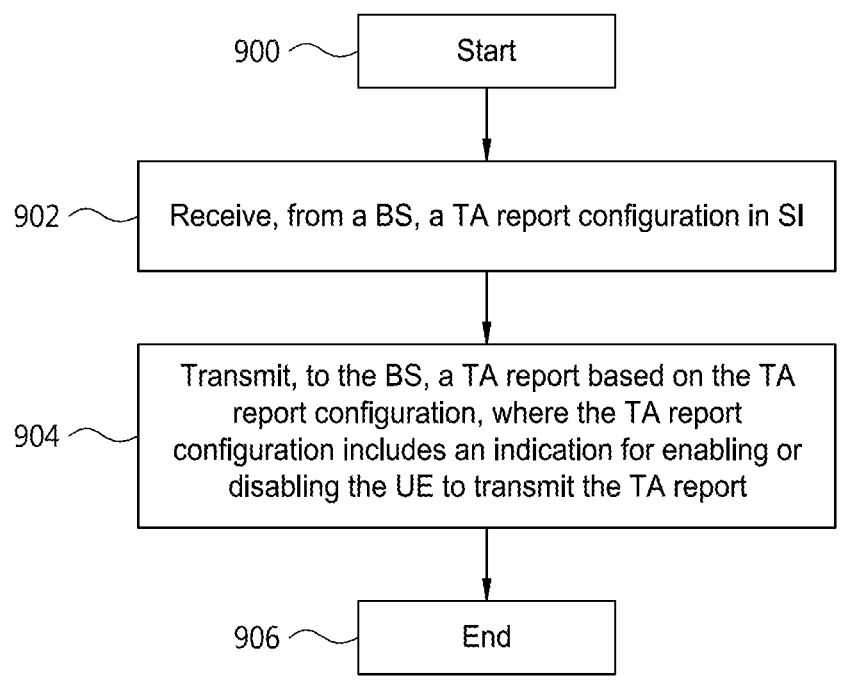
FIG. 9 illustrates a flowchart of a procedure performed by a UE for timing alignment, according to an example implementation of the present disclosure.

FIG. 9 illustrates a flowchart of a procedure 90 performed by a UE for timing alignment, according to an example implementation of the present disclosure. In some implementations, actions of the procedure 90 are illustrated as separate actions represented as independent blocks. In some other implementations, these separate actions may not be construed as necessarily order dependent, where any two or more actions may also be performed and/or combined with each other or be integrated with other alternate methods, which is not limiting the scope of the implementation. Moreover, in some other implementations, one or more of the actions may be adaptively omitted.

As shown in FIG. 9, the process 90 for the UE includes the following actions:

Action 900: Start.

Action 902: Receive, from a BS, a TA report configuration in SI.

Action 904: Transmit, to the BS, a TA report based on the TA report configuration, where the TA report configuration includes an indication for enabling or disabling the UE to transmit the TA report.

Action 906: End.

In some implementations, in action 902, the UE may receive the TA report configuration in SI from the BS. In action 904, the UE may transmit the TA report based on the TA report configuration to the B S, where the TA report configuration may include the indication for the UE, such that the UE may be enabled/disabled to transmit the TA report.

In some implementations, the TA report may include a least integer number of slots that are greater than or equal to a TA value. In some implementations, the TA value may correspond to a UE-specific TA and may be calculated based on at least one of GNSS position information, a common TA, and satellite ephemeris information. In some implementations, the indication may be provided by an NTN-specific SIB.

Figure 10:
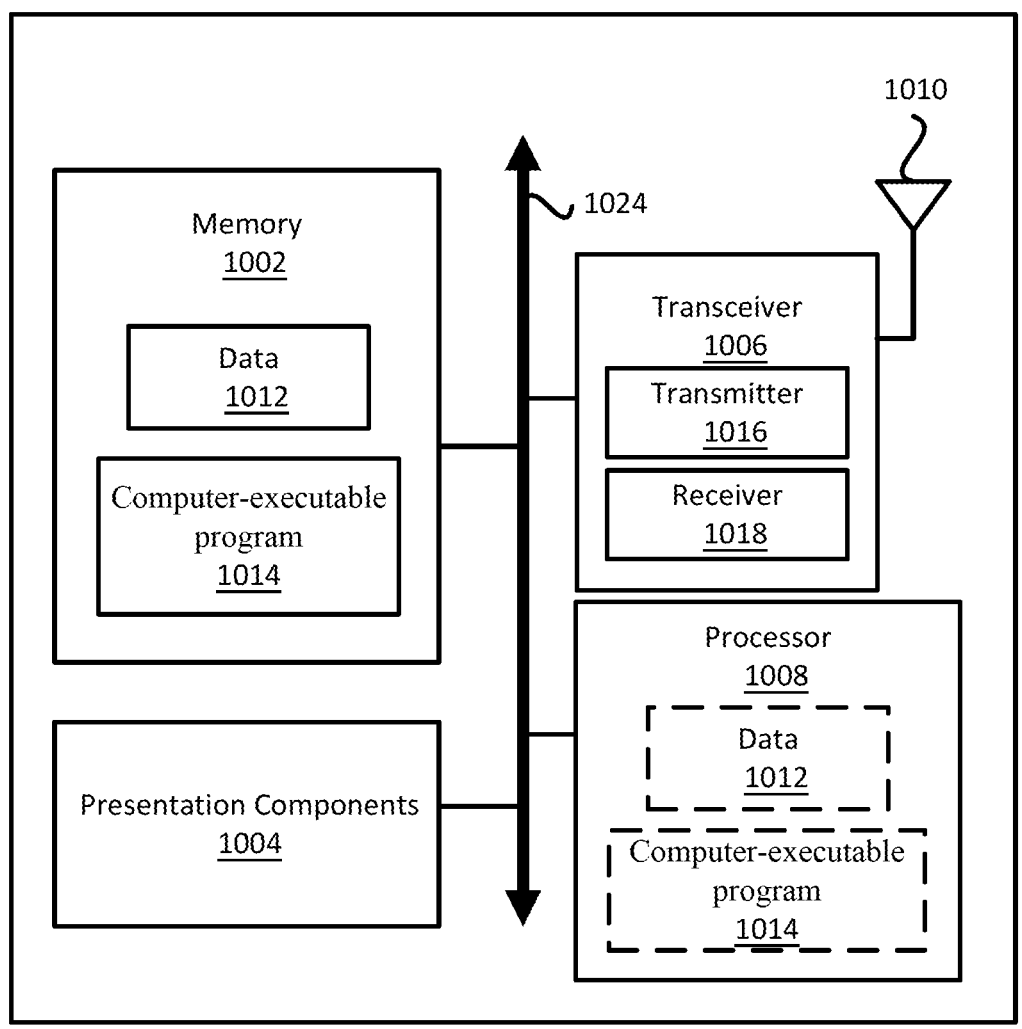
FIG. 10 is a block diagram illustrating a node for wireless communication according to an implementation of the present disclosure.

Please refer to FIG. 10, which illustrates a block diagram of a node 1000 for wireless communication according to an implementation of the present disclosure. As illustrated in FIG. 10, the node 1000 includes a transceiver 1006, a processor 1008, a memory 1002, one or more presentation components 1004, and at least one antenna 1010. The node 1000 may also include a Radio Frequency (RF) spectrum band module, a BS communications module, an NW communications module, and a system communications management module, input/output (I/O) ports, I/O components, and power supply (not explicitly illustrated in FIG. 10). Each of these components may be in communication with each other, directly or indirectly, over one or more buses 1024. The node 1000 may be a UE, an NW, a cell/BS or any operating entity in the wireless communication system that performs various functions disclosed herein, for example, with reference to FIG. 9.

The transceiver 1006 includes a transmitter 1016 (e.g., transmitting/transmission circuitry) and a receiver 1018 (e.g., receiving/reception circuitry) and may be configured to transmit and/or receive time and/or frequency resource partitioning information. The transceiver 1006 may be configured to transmit in different types of subframes and slots, including, but not limited to, usable, non-usable and flexibly usable subframes and slot formats. The transceiver 1006 may be configured to receive data and control channels.

The node 1000 may include a variety of computer-readable media. Computer-readable media may be any available media that may be accessed by the node 1000 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media.

The term "modulated data signal" may refer to a signal that has one or more of its characteristics set or changed in such a manner as to encode information in the signal. By way of example, and not limitation, communication media may include wired media such as a wired NW or direct-wired connection, and wireless media such as acoustic, RF, infrared, and other wireless media. Combinations of any of the previous disclosure should also be included within the scope of computer-readable media.

The memory 1002 may include computer-storage media in the form of volatile and/or non-volatile memory. The memory 1002 may be removable, non-removable, or a combination thereof. For example, the memory 1002 may include solid-state memory, hard drives, optical-disc drives, etc.

As illustrated in FIG. 10, the memory 1002 may store a computer-executable (or readable) program 1014 (e.g., software codes or instructions) that are configured to, when executed, cause the processor 1008 to perform various functions disclosed herein, for example, with reference to FIG. 9. Alternatively, the computer-executable program 1014 may not be directly executable by the processor 1008 but may be configured to cause the node 1000 (e.g., when compiled and executed) to perform various functions disclosed herein.

The processor 1008 (e.g., having processing circuitry) may include an intelligent hardware device, a CPU, a microcontroller, an ASIC, etc. The processor 1008 may include memory. The processor 1008 may process the data 1012 and the computer-executable program 1014 received from the memory 1002, and information received via the transceiver 1006, the baseband communications module, and/or the NW communications module. The processor 1008 may also process information to be sent to the transceiver 1006 for transmission through the antenna 1010 to the NW communications module for subsequent transmission to a CN.

One or more presentation components 1004 may present data to a person or other device. Examples of presentation components 1004 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) for timing alignment, the method comprising:
    receiving, from a Base Station (BS), a Timing Advance (TA) report configuration via System Information (SI); and
    transmitting, to the BS, a TA report based on the TA report configuration,
    wherein:
        the TA report configuration includes an indication for enabling or disabling the UE to transmit the TA report, and
        the TA report comprises a least integer number of slots that is determined by applying a ceiling function to a TA value, such that the least integer number of slots is greater than or equal to the TA value.

2. The method of claim 1, wherein the TA value corresponds to a UE-specific TA, and is calculated based on at least one of Global Navigation Satellite System (GNSS) position information, a common TA, and satellite ephemeris information.

3. The method of claim 1, wherein the indication is provided by a Non-Terrestrial Network (NTN)-dedicated System Information Block (SIB).

4. A User Equipment (UE) for performing timing alignment in a wireless communication system, the UE comprising:
    at least one processor; and
    at least one non-transitory computer-readable medium coupled to the at least one processor and storing one or more computer-executable instructions that, when executed by the at least one processor, cause the UE to:
- receive, from a Base Station (BS), a Timing Advance (TA) report configuration via System Information (SI); and
- transmit, to the BS, a TA report based on the TA report configuration,
- wherein:
  - the TA report configuration includes an indication for enabling or disabling the UE to transmit the TA report, and
  - the TA report comprises a least integer number of slots that is determined by applying a ceiling function to a TA value, such that the least integer number of slots is greater than or equal to the TA value.

5. The UE of claim 4, wherein the TA value corresponds to a UE-specific TA, and is calculated based on at least one of Global Navigation Satellite System (GNSS) position information, a common TA, and satellite ephemeris information.

6. The UE of claim 4, wherein the indication is provided by a Non-Terrestrial Network (NTN)-dedicated System Information Block (SIB).

\* \* \* \* \*